United States Patent [19]

Santagiuliana

[11] Patent Number: 5,407,105
[45] Date of Patent: Apr. 18, 1995

[54] MEASURING/DISPENSING DEVICE FOR LIQUID PRODUCTS

[75] Inventor: Evans Santagiuliana, Vicenza, Italy

[73] Assignee: Taplast SRL, Dueville, Italy

[21] Appl. No.: 211,332

[22] PCT Filed: Sep. 8, 1993

[86] PCT No.: PCT/EP93/02425
§ 371 Date: Mar. 22, 1994
§ 102(e) Date: Mar. 22, 1994

[87] PCT Pub. No.: WO94/05978
PCT Pub. Date: Mar. 17, 1994

[30] Foreign Application Priority Data
Sep. 10, 1992 [IT] Italy ................... VI92A0130

[51] Int. Cl.6 ............................................. G01F 11/26
[52] U.S. Cl. ..................................... 222/425; 222/455
[58] Field of Search ................. 222/425, 442, 450–457

[56] References Cited

U.S. PATENT DOCUMENTS

| | | | |
|---|---|---|---|
| 1,279,014 | 9/1918 | Schimel | 222/451 X |
| 1,687,705 | 10/1928 | Androff | 222/455 X |
| 1,916,819 | 7/1933 | Acosta | 222/455 X |
| 2,343,847 | 3/1944 | Swann | 222/451 X |
| 2,530,012 | 11/1950 | Gronemeyer et al. | 222/451 X |
| 3,176,889 | 4/1965 | Potapenko | 222/453 X |
| 4,679,714 | 7/1987 | Blake | 222/453 X |
| 4,728,011 | 3/1988 | Schuster et al. | 222/456 X |
| 4,756,433 | 7/1988 | Lin | 222/207 X |
| 4,807,785 | 2/1989 | Pritchett | 222/453 X |
| 5,044,527 | 9/1991 | Hickerson | 222/451 |

Primary Examiner—Andres Kashnikow
Assistant Examiner—Kenneth R. DeRosa
Attorney, Agent, or Firm—Watson, Cole, Grindle & Watson

[57] ABSTRACT

A measuring and dispensing device for liquids is disclosed. The device includes a first element for holding a measured quantity of liquid to be dispensed; a second element which is slidably coupled to the first element and which has slits for allowing the liquid to flow therethrough; and a third element which includes a first tubular part adapted to be connected to the container and a second tubular part coupled to the first element which defines a central dispensing duct and an annular measuring chamber. The second and third elements are manufactured in a single molded piece and are provided with a flexible element for facilitating or guiding the first element into the second element and for retaining the same therein in slidable relation.

12 Claims, 6 Drawing Sheets

MEASURING/DISPENSING DEVICE FOR LIQUID PRODUCTS

BACKGROUND OF THE INVENTION

The invention concerns an improved measuring/dispensing device for liquid products.

It is a known fact that detergents are sold in containers, often provided with a measuring cap, which guarantees the dispensing of a pre-determined and constant quantity of detergent.

Some measuring/dispensing devices of the known type, foresee the use of a ball placed in the interior of dispensing channels and immersed in the liquid detergent, which, whenever the container is capsized, moves toward the dispensing hole thus occluding it after a while.

Said measuring devices present the inconvenience of having a rather limited precision, the dispensed quantity being influenced by various parameters, such as the different speed at which the ball falls down depending on the viscosity of the liquid detergent into which said ball is immersed, the speed variations of the ball depending on the degree of inclination of the container and finally, the speed differences of the detergent itself in relation to the liquid head.

Other types of as well-known measuring devices present a measuring chamber, into which the detergent to be dispensed enters when the container is capsized, and a collecting chamber, into which the measured detergent enters when the container is brought back to its upright position. The dispensing of the product occurs when the container is capsized again, at which point the pre-measured detergent flows out of the collecting chamber, while a new quantity of detergent flows from the container into the measuring chamber.

Such measuring devices present the inconvenience of being rather imprecise when the change of the container from its vertical position into the dispensing slanted position occurs slowly.

In order to overcome the mentioned inconveniences, the measuring-dispensing device for liquid products object of the deposit n. 85695 in the name of the same inventor has been disclosed, said device presenting an external body, connected to the container, and a dispensing duct, internally co-axial with the external body, a ring-shaped area being defined between them in which a measuring element is arranged, which slides axially and is freely coupled with the external body.

When the container is capsized, the measuring element slides within the external body, thus allowing a measuring chamber to be filled up; its contents subsequently flow into the measuring element, when the container is brought back to its upright position.

When the container is capsized again, the dispensing of the pre-measured detergent occurs, while, at the same time, the measuring chamber is filled up again.

The described measuring-dispensing device realises a measuring precision which is independent from the liquid density, but presents the inconvenience of being of rather complex manufacture because it consists of three separate pieces.

Moreover, said pieces, which must be connected together and to the container, require also a considerable assembly work which is normally performed with automatic assembling machines.

SUMMARY OF THE INVENTION

It is the purpose of the present invention to obtain a measuring-dispensing device consisting of separate parts, the number of which is smaller than that of the above mentioned measuring-dispensing device.

It is yet another purpose for said measuring-dispensing device to present all the advantages of the mentioned measuring-dispensing devices.

It is another purpose that the manufacture and the assembly of the measuring-dispensing device according to the invention can be more economical in relation to the measuring-dispensing devices of the known type. The described purposes are reached by a measuring-dispensing device for liquid substances, which, in accordance with the main claim comprises:

a first element for holding the measured product to be dispensed, presenting a holding chamber closed by a bottom layer, connected to a collecting chamber through a truncated-conic intersecting surface;

a second element consisting of a tubular body sliding coupled with the external surface of the collecting chamber of said first element, said second element presenting an open bottom provided with means for holding said first element after they have been coupled, and with one or more slits for the transit of the substance, made in the tubular body itself;

a third element comprising a first tubular part, attached to the container through coupling means and a second tubular part, internally coupled with the collecting chamber of the mentioned first element, said tubular parts being connected to one another through an annular area, wherein said second tubular part defines in its interior a dispensing duct and on its exterior it defines a measuring chamber delimited by the inner wall of the collecting chamber of the first element, and is characterized in that said second element and said third element are obtained in a single piece through a moulding process, the upper rim of said second element belonging to the annular area of said third element, said second element being also provided with leading means and with elastic deformation means suited to help the yielding of the tubular body forming it, in order to house the coupling of the collecting chamber of the first element, as well as with supporting means suited to prevent the separation of the first element when the coupling has occurred.

Advantageously, the measuring-dispensing device according to the invention is less costly to manufacture as compared with the measuring devices of the same type.

Moreover, advantageously it is of simpler assembly, being formed by a smaller number of pieces which make it possible to simplify the assembling cycle in the automatic assembling machines.

BRIEF DESCRIPTION OF THE DRAWINGS

Further scope of applicability of the present invention will become apparent from the detailed description given hereinafter. However, it should be understood that the detailed description and specific example, while indicating a preferred embodiment of the invention, are given by way of illustration only, since various changes and modifications within the spirit and scope of the invention will become apparent to those skilled in the art from this detailed description and from the drawings, wherein.

DESCRIPTION OF THE INVENTION

Figure 1:
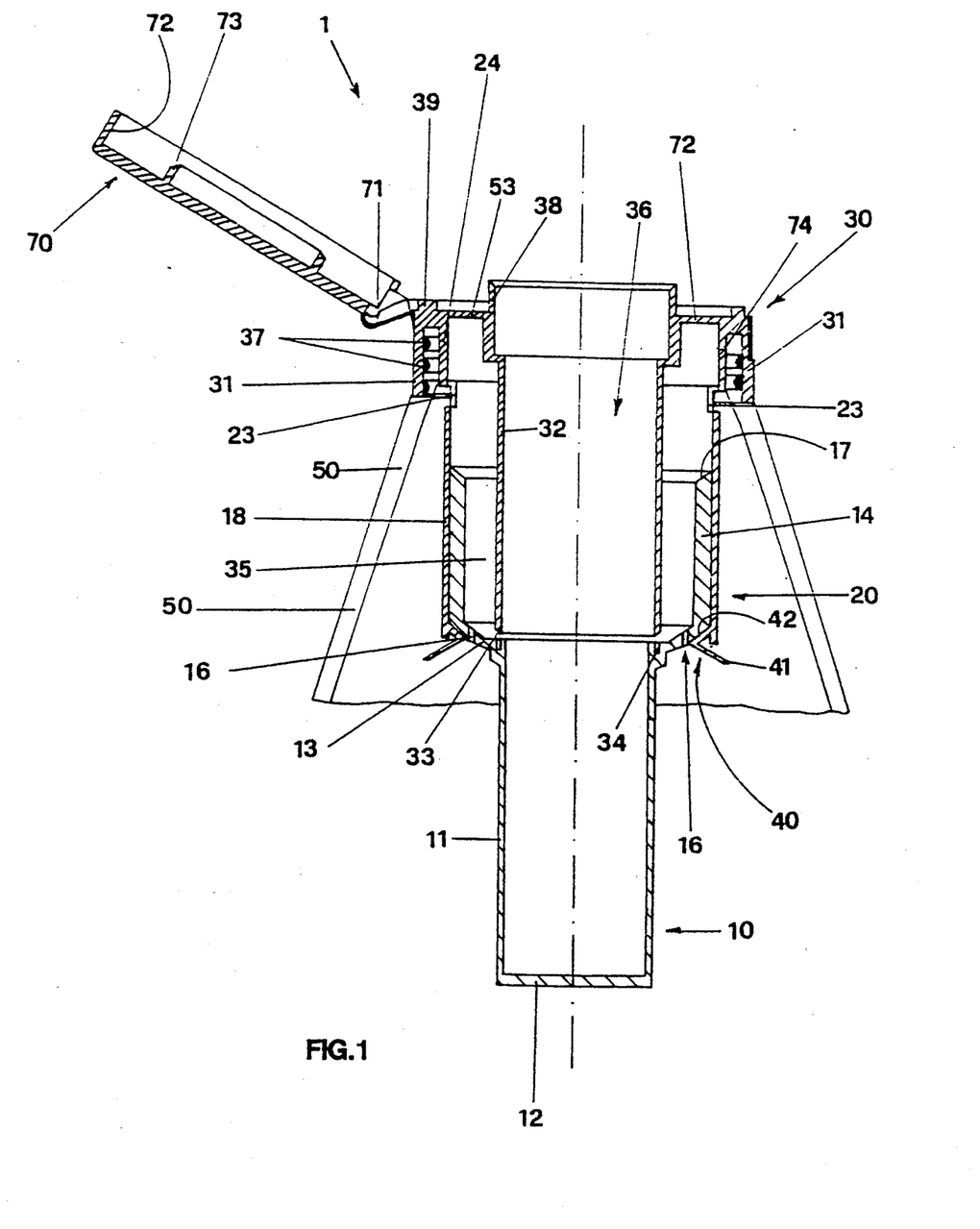
FIG. 1 represents in a cross-section the measuring-dispensing device according to the invention, coupled with a container.
Figure 2:
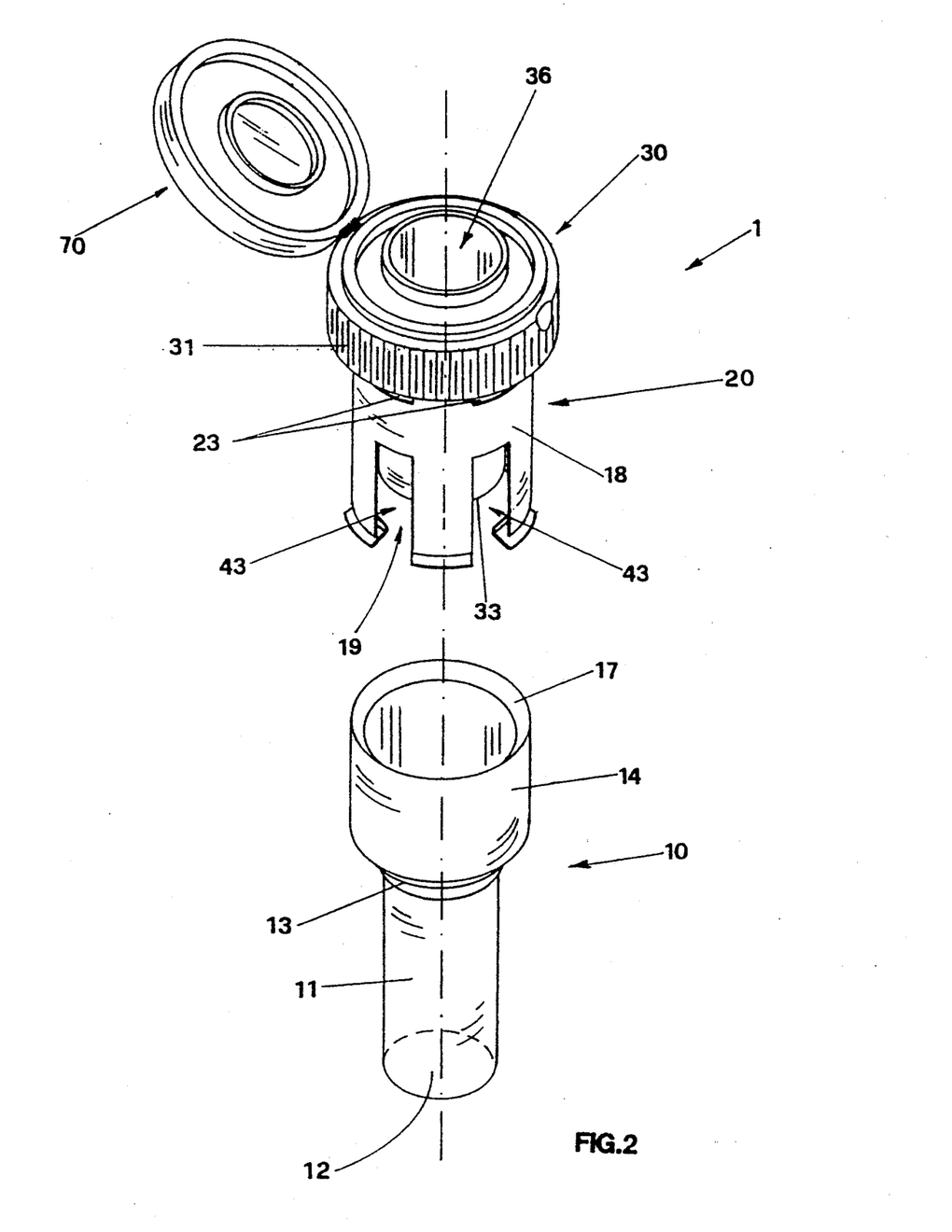
FIG. 2 represents the measuring-dispensing device in an exploded view of its components.

As can be observed in FIG. 1 and in FIG. 2, the measuring-dispensing device according to the invention, indicated as a whole with 1, comprises a first element, indicated as a whole with 10, presenting a holding chamber 11 provided with a bottom layer 12, connected to a collecting chamber 14 ending with a bevelled rim 17 through a truncated-conic intersecting surface 13.

The measuring-dispensing device comprises a second element too, indicated as a whole with 20, presenting a tubular body 18 provided with an open bottom 19 at one end and with slits 23 on the side for the transit of the product.

Finally, the measuring-dispensing device is completed with a third element, indicated as a whole with 30, and presenting a first tubular part 31 attached to the container 50 through a thread 37 and a second tubular part 32, internal in relation to the first one, within which a dispensing duct 36 is defined, said tubular parts being connected to one another through an annular area 53. The device is completed with a lid 70 connected to the first tubular part 31 of the third element 30 through a tab 71.

It can be observed in particular in FIG. 1 that the second element 20 presents the upper rim 24 realising a single body with the annular area 53 of the third element 30, the second element 20 and the third element 30 being obtained in a single piece during the moulding process and form therefore, at the end of said moulding process, a single body.

This fact allows to simplify the manufacture of the measuring-dispensing device and to make faster and easier the assembling for the automatic machines, the pieces to be assembled being reduced in number.

In order to assemble the measuring-dispensing device, it is necessary to couple the collecting chamber 14 of the first element 10 within the tubular body 18 which forms the second element 20.

Figure 3:
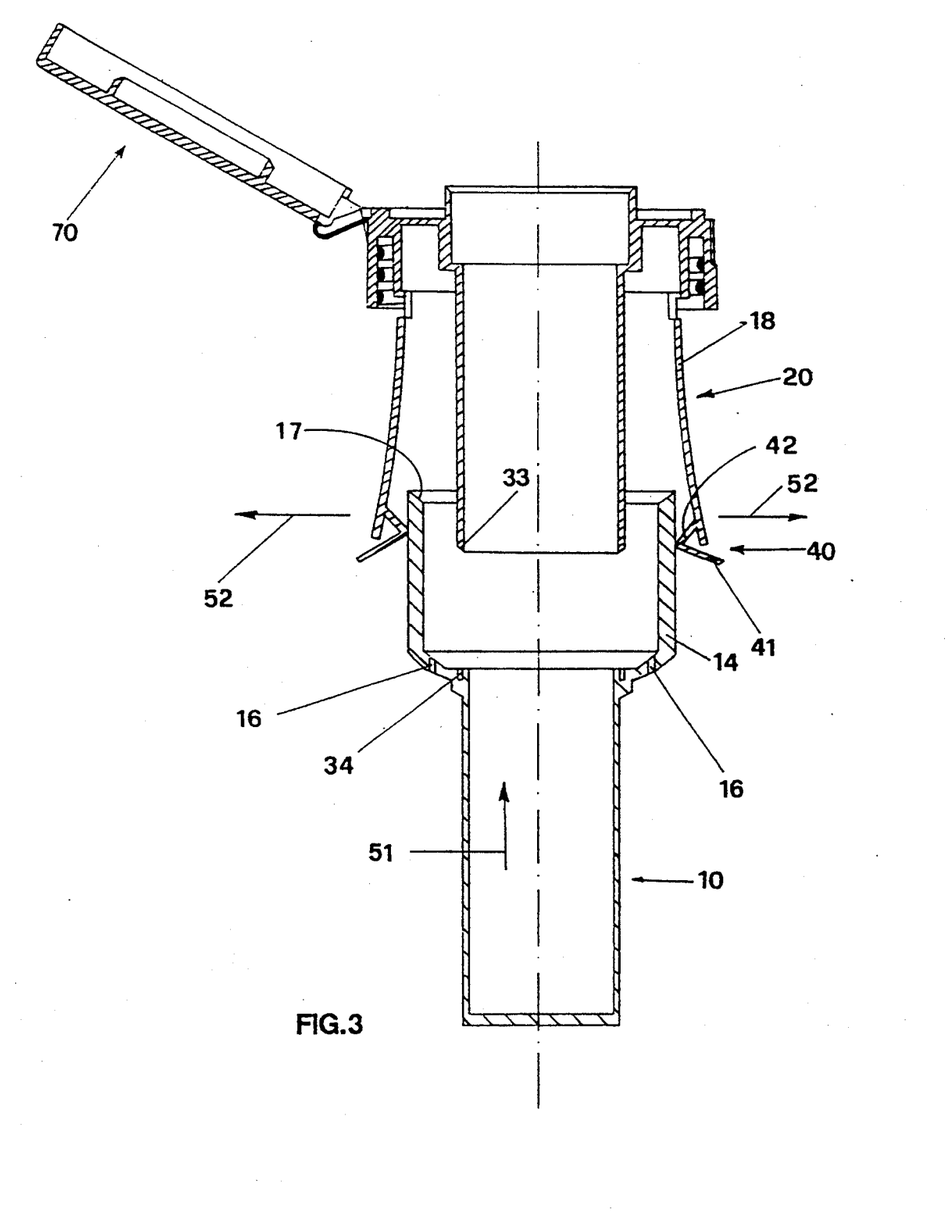
FIG. 3 represents the measuring-dispensing device of FIG. 2 during the joining phase of the first element to the second and third element.

For this purpose, as can be observed in FIG. 2 and also in FIG. 3, the second element 20 presents in correspondence with the open bottom 19, a rim 40 consisting of a truncated-conic lip 41, converging toward the interior of the element which intersects with another truncated-conic lip 42 diverging from and ending against the inner surface of the tubular body 18 which is provided with notches 43.

When the upper rim 17 of the first element 10 is axially pushed following direction 51 against the converging truncated-conic lip 41 of the second element 20, it radially stresses the tubular body 18 of said second element, which, because of the presence of the notches 43, expands radially following direction 52, thus allowing the collecting chamber 14 to penetrate into the tubular body 18, as can be observed in FIG. 3.

When the coupling has been completed, as can be observed in FIG. 1, the divergent truncated-conic lip 42 of rim 40 belonging to the second element 20, contrasts against the truncated-conic intersecting surface 13 of the first element 10 and acts as a holding element which prevents the mutual separation between the first element 10 and the second element 20.

The first element 10, driven by the tubular body 18 of the second element 20 within which is coupled, can, therefore, slide axially.

Figure 4:
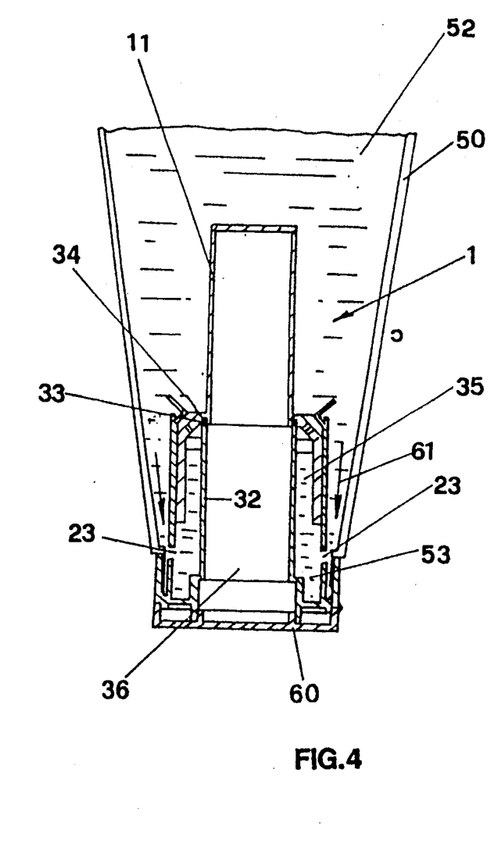
FIG. 4 represents the measuring-dispensing device of FIG. 1 while the measuring chamber is being filled up.

In order to make the measuring-dispensing device function, it is necessary first of all, to capsize the container, as indicated in FIG. 4, so that rim 33 of the second tubular part 32 belonging to the third element 30, penetrates into the annular impression 34 of the first element 10, thereby sealing the annular opening 44 for the transit of the liquid from the annular measuring chamber 35 to the holding chamber 11, said annular measuring chamber being comprises between the second tubular part 32 of the third element 30 and the collecting chamber 14 of the first element 10, so as to isolate the two corresponding spaces. As the second tubular part 32 belonging to the third element 30 of the device defines also, as has already been said, a dispensing duct, indicated with 36, which is in communication with the holding chamber 11, when the measuring-dispensing device is capsized, the liquid 52 contained in container 50, enters into the annular measuring chamber 35 following direction 61, through the slits 23.

Figure 5:
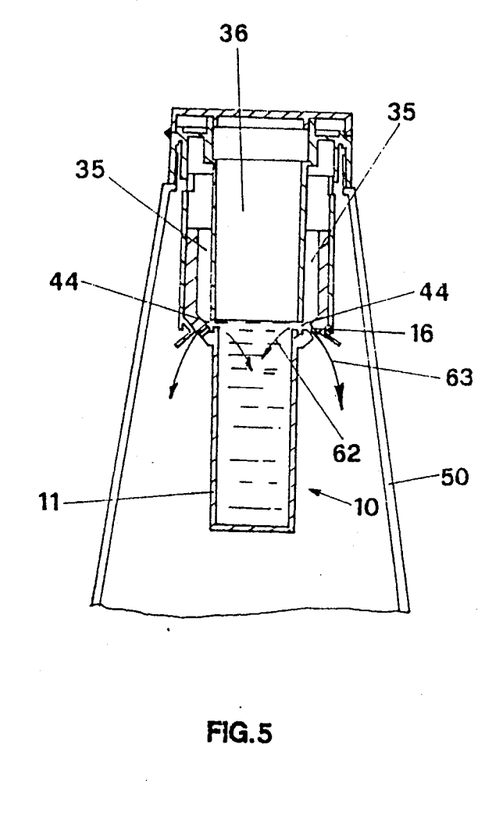
FIG. 5 represents the measuring-dispensing device of FIG. 1 while the holding chamber is being filled up.

When the container is brought back to its upright position, as can be observed in FIG. 5, the first element 10 moves away from the rim 33 of the second tubular part 32 because of the gravity, thus opening the annular opening 44 through which the measured dose is conveyed from the annular measuring chamber 35 into the holding chamber 11 following direction 62, while the quantity of liquid exceeding the volume of the holding chamber 11, flows out through the holes 16 made on the truncated-conic intersecting surface 13 following direction 63, and returns into the container 50 itself.

Figure 6:
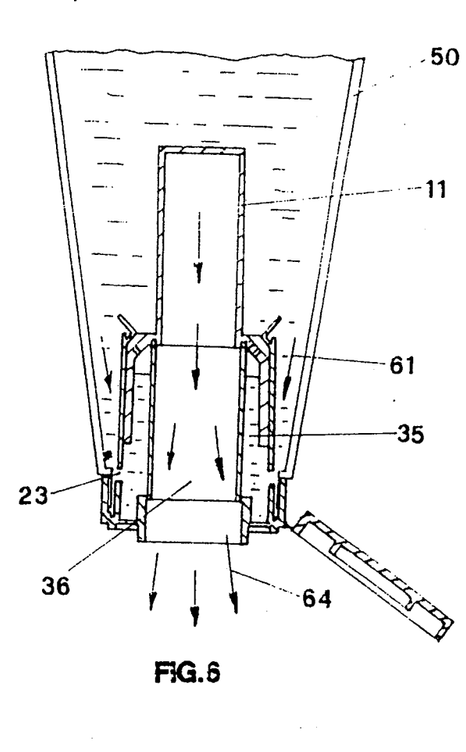
FIG. 6 represents the measuring-dispensing device of FIG. 1 while the liquid product is being dispensed.

Another capsizing of the container, as can be observed in FIG. 6, permits to the dose contained in the holding chamber 11 to flow out through the dispensing duct 36 following direction 64, while, at the same time, another dose of substance is being filled up into the annular measuring chamber 35 passing through the slits 23, again with direction 61.

The device according to the invention is completed with a lid 70 which is moulded together with the third element 30 of the device and which presents an annular external rim 72 engaging with the corresponding projection 39 belonging to the more external part of the third element 30, while the annular external rim 73 of the lid 70 engages on the rim 38 belonging to the second tubular part 32 of the third element 30 itself.

Figure 7:
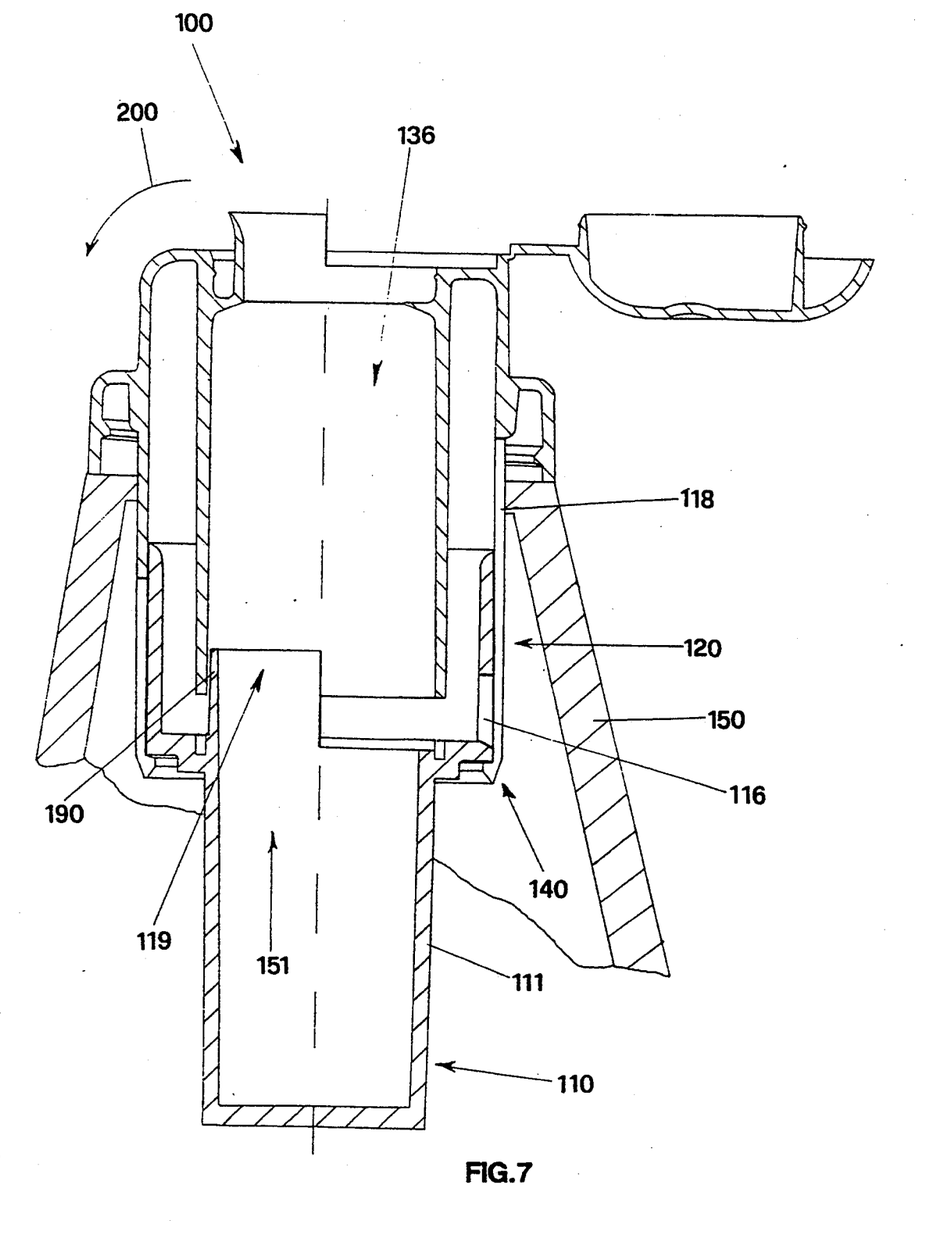
FIG. 7 represents in a cross-section a different embodiment of the measuring-dispensing of the invention.
Figure 8:
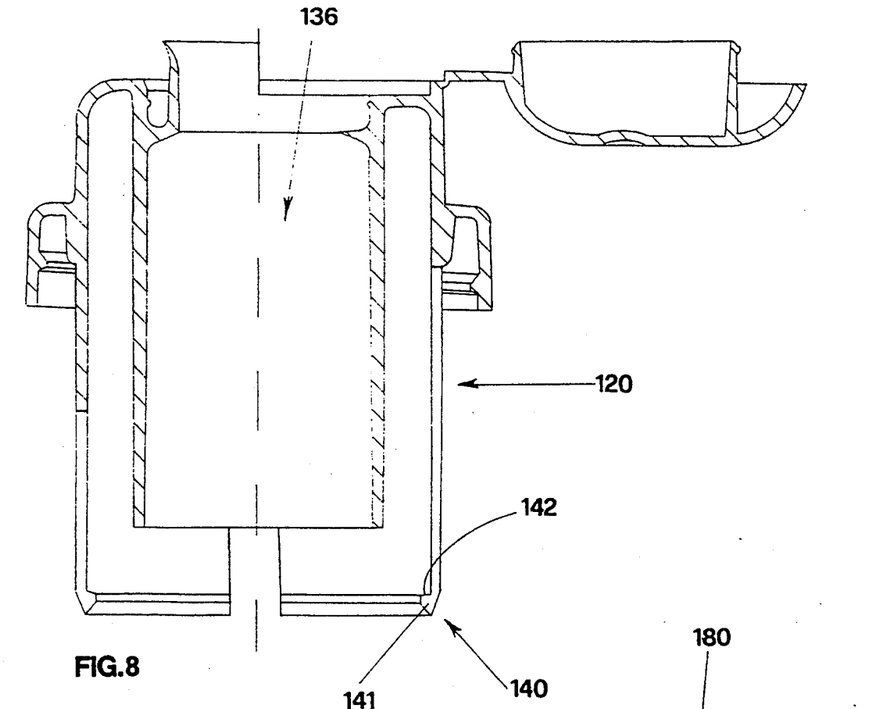
FIG. 8 represents one of the elements which compose the device of FIG. 7.
Figure 9:
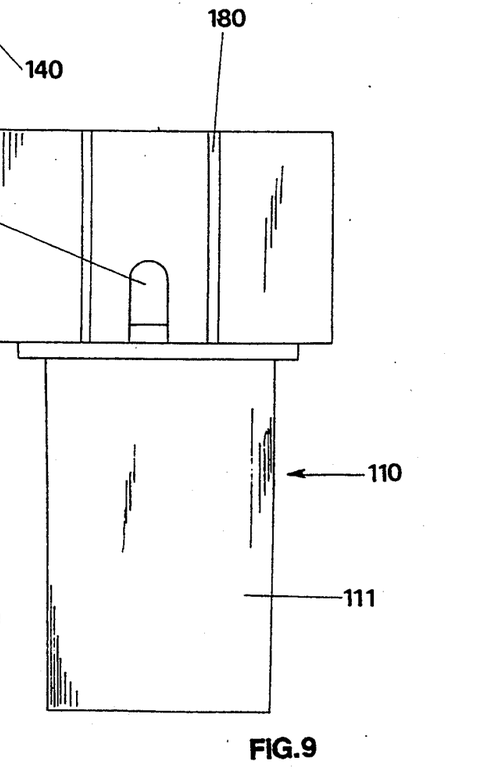
FIG. 9 represents a further element which composes the device in FIG. 7.
Figure 10:
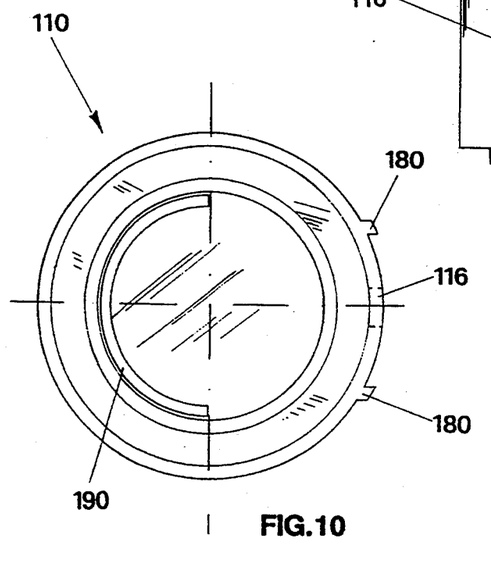
FIG. 10 represents a plan view of the element represented in FIG. 9.

A different embodiment of the measuring-dispensing device of the invention based on the same resolutive idea is represented in FIG.7 where you can see that the measuring-dispensing device, showed on the whole with 100 comprises a first element, showed on the whole with 110, also represented in FIGS. 9 and 10 and a second element, showed on the whole with 120, also represented in FIG. 8.

In particular, in FIG. 7 and in FIG. 8 you can see that said second element 120 presents, near the open bottom 119, a rim 140 having a truncated conic profile 141 with the conicity facing said open bottom 119 and provided, in the internal zone, with a shoulder 142 which makes the first element 110 hold when it is internally coupled to the second element 120 and when it is disposed vertically as represented in FIG. 7.

Also in this embodiment, the coupling of said elements between them happens by a radial elastic deformation of the rim 140 appertaining to the second element 120 when the first element 110 is pushed inside the open bottom 119 of the second element 120 following the direction 151.

About the first element 110 you can see, particularly referring to FIGS. 9 and 10, that it laterally presents an opening 116 which functions both as a discharger, in the container 150 to which the measuring dispensing device is coupled of the quantity of liquid exceeding the volume of the holding chamber 111 and as a device which escapes air, if contained inside.

You can also see that on the opposite part from the opening 116 is disposed a conveyor 190, constituted by a surface having a substantially semicircular form, disposed on the continuity of the tubular surface which defines the holding chamber 111.

When said first element 110 is coupled to said second element, said conveyor 190 projects inside the second element 120 and functions as on orientator of the liquid flux in the dispensing duct 136 during the pouring.

Finally, you can see that said first element 110 presents also a couple of orienting ribs 180 disposed symmetrically and on opposite sides from the opening 116, suitable for coupling in corresponding seats made in the tubular body 118 of the second element 120.

The scope of said ribs is that, when the first element is coupled to the second element 120, the conveyor 190 is disposed as represented in FIG. 7. In this way the conveyor 190 is oriented on the frontal part of the measuring-dispensing device so that the pouring of the product is favoured when the container is rotated in the direction 200. On the basis of what has been described, it is easy to understand how the measuring-dispensing device according to the invention reaches the proposed purposes.

In fact the purpose of obtaining a measuring-dispensing device presenting a smaller number of components in relation to the measuring-dispensing devices of the known type having similar characteristics is reached. Moreover the purpose of simplifying the manufacturing processes as well as that of allowing a simpler and, therefore, less costly assembly, thus reducing the assembly cycle on the assembling machine is also reached.

During the manufacturing process the measuring-dispensing device according to the invention, may undergo some modifications concerning both the shape of the components and their dimensions.

Moreover, the shape, the number and the dimensions of the leading means and of the deformation means which allow the coupling of the elements forming the measuring-dispensing device according to the invention may also.

It is however understood that the mentioned modifications or any others must be considered to fall under the spirit and the scope protected by the present invention.

I claim:

1. A device for measuring and dispensing liquids from a container comprising:

a first element for holding a measured amount of liquid to be dispensed, including a holding chamber formed with a closed bottom; a collecting chamber; and a truncated-conic intersecting surface connecting the holding chamber and the collection of chamber;

a second element including a tubular body having a distal end formed with axial slots therein and being slidably coupled externally of the collecting chamber, said second element having an open bottom and an upper rim; and flexible means for engaging with and securing said first element therein and having at least one slit for allowing flow of the liquid therethrough;

a third element including a first tubular member for attachment to the container and a second tubular member disposed inwardly of the collecting chamber of the first element and an annular member for connecting said first and second tubular members, said collecting chamber having an annular opening, said second tubular member defining a dispensing duct and an exterior of the second tubular member defining a measuring chamber delimited by the inner wall of the collecting chamber of the first element, said second element and said third element being formed as a single piece, the upper rim of said second element being located adjacent to the annular member of said third element, said second element including leading means and interconnected elastic deformation means secured to the slotted distal end of the second element for yieldably guiding and receiving the tubular body in order to slidably house the collecting chamber therein, and said elastic deformation means having an inwardly facing supporting surface for engaging the truncated-conic intersecting surface for supporting the first element within the second element and preventing separation after engagement thereof.

2. A device according to claim 1 wherein the truncated-conic surface connecting the holding chamber and the collecting chamber has holes for draining excess liquid therefrom.

3. A device according to claim 1 wherein the second tubular part has a rim and the truncated-conic intersecting surface of the first element has a mating annular impression for engaging the rim while the device is inverted and closing the annular opening, and engaging the measuring chamber and the holding chamber in flow communication.

4. A device according to claim 1, wherein the leading means comprises a first truncated-conic lip converging toward the interior of said second element and wherein said the inwardly facing supporting surface of the deformation means includes a second truncated-conic lip corresponding with the first truncated-conic lip of the leading means diverging from an internal surface of the tubular body for holding and preventing the separation of the first and second elements when coupled, said first and second truncated-conic lips each being in the form of a single rim arranged in correspondence with the open bottom of the tubular body.

5. A device according to claim 1, wherein the elastic deformation means and the notches in said second element enable yielding of the tubular body for receiving the tubular body therein.

6. A device according to claim 5 wherein the notches are in the form of open slits disposed longitudinally of the second element.

7. A device according to claim 1 wherein said third element includes a lid having an external annular rim and said outlet duct has a corresponding rim for mating therewith an internal annular rim.

8. A device according to claim 1 wherein first element has at least one lateral opening suitable for discharging an excess quantity of liquid from the holding chamber.

9. A device according to claim 1, wherein said coupling means located in said second element has a rim having a truncated-conic profile facing the open bottom of said second element.

10. A device according to claim 9 wherein said rim of said second element has an internally projecting supporting shoulder.

11. A device according to claim 1 wherein said first element has at least one externally projecting longitudinal rib and the second element has at least one corresponding seat for engaging said at least one rib and said at least one corresponding seat being suited to define a mutually cooperating coupling position of said first element with respect to said second element.

12. A device according to claim 1 wherein said first element includes a conveyor having a substantially semicircular surface which defines the holding chamber of said first element, said conveyor projecting inside said second element.

* * * * *